Patented Dec. 1, 1925.

1,564,091

UNITED STATES PATENT OFFICE.

WALTER MIEG, OF VOHWINKEL, AND HEINRICH RAEDER, OF LEVERKUSEN, NEAR COLOGNE, GERMANY, ASSIGNORS TO GRASSELLI DYESTUFF CORPORATION, OF NEW YORK, N. Y., A CORPORATION OF DELAWARE.

SULFONATED OXY-DIANTHRAQUINONYLAMINE DYESTUFFS AND PROCESS OF MAKING THE SAME.

No Drawing. Application filed August 17, 1925. Serial No. 50,869.

*To all whom it may concern:*

Be it known that we, (1) WALTER MIEG and (2) HEINRICH RAEDER, citizens of Germany, residing at (1) Vohwinkel, and (2) Leverkusen, near Cologne, State of Prussia, Germany, have invented new and useful Improvements in Sulfonated Oxy-Dianthraquinonylamine Dyestuffs and Process of Making the Same, of which the following is a specification.

We have invented new and useful improvements in dyestuffs of the dianthraquinonylamine series of which the following is a specification.

Our invention consists in the correct conditions for producing oxidation products of dianthraquinonylamine sulfonic acids and in the substantially pure products obtained by this process.

Dianthraquinonylamines having the general formula $C_{14}H_7O_2$—NH—$C_{14}H_7O_2$ have first been produced by condensing aminoanthraquinones with halogen anthraquinones. This reaction, as well as the products obtained by it are described for instance in U. S. Patent #814,137. It is stated further in this patent that by treating unsubstituted dianthraquinonylamines with sulfonating agents, dyestuffs are obtained which dye wool in an acid bath fast reddish brown shades. This reaction has, however, never found any practical application.

We have now found that the treatment of unsubstituted dianthraquinonylamines, as stated in the above mentioned patent, with sulfonating agents is a very complex reaction and that a mixture of different compounds is obtained, which produces on animal fibres unsightly and valueless shades. The two main reactions involved in the treatment of dianthraquinonylamines with sulfonating agents consist in a straight sulfonation and in a joint sulfonation and oxidation. This latter reaction produces probably hydroxy-dianthraquinonylamine sulfonic acids. In the case where two hydroxyl groups are obtained in ortho position to the imid group, they may react further under dehydration to form oxazines of the formula

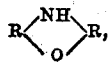

in which R stands for an anthraquinone nucleus, and we wish it to be understood that the term oxy-dianthraquinonylamine sulfonic acids as used herein, is meant to include hydroxy-dianthraquinonylamine sulfonic acids as well the oxazines obtained therefrom.

We have now found the correct conditions whereby oxy-dianthraquinonylamine sulfonic acids, substantially free from straight sulfonic acids, are produced.

The dyeing properties, particularly shades, of both types of compounds; i. e., straight acids and oxy-acids, are now entirely different, and whereas the crude mixture of sulfonic acids and oxy-sulfonic acids, as obtained in the above cited U. S. patent produces only undesirable shades, the pure compounds produce on animal fibres shades, which due to their brilliancy and fastness, have proven exceedingly valuable. Both types of compounds can be easily distinguished chemically. We have, for instance, found that whereas an addition of formaldehyde to the sulfuric acid solution of the straight dianthraquinonylamine sulfonic acids produces an intense change of the color of these solutions, no such change appears in solutions of oxy-dianthraquinonylamine sulfonic acids.

Whereas the production of straight dianthraquinonylamine sulfonic acids is described in our application 50868 filed at even date, we describe herein the process for the oxidative sulfonation and the oxy-dianthraquinonylamine sulfonic acids, themselves.

By treating dianthraquinonylamines with sulfuric acid containing a certain amount of free sulfur trioxid, as for instance oleum containing from 15-30% $SO_3$ at temperatures exceeding 100° C., but preferably from 120-150° C., the sulfonation is accompanied by introduction of hydroxyl groups and substantially complete transformation of eventually first formed straight sulfonic acids into oxy-acids. While these conditions are in certain cases sufficient to produce an oxidative sulfonation, it is in other cases advisable to add a catalyst to the reaction mixture. Boric acid, mercury oxid and other oxygen carriers are particularly useful for this purpose.

The dianthraquinonylamines which can be used to advantage in our novel process, are the 1—1'-dianthraquinonylamine of the formula

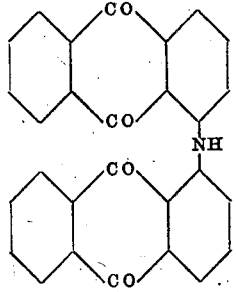

and the 1—2'-dianthraquinonylamine of the formula

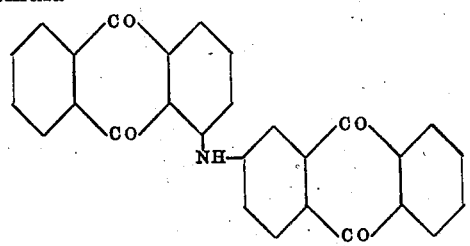

The new substantially homogeneous oxy-dianthraquinonylamine sulfonic acids are dark brownish-violet to blue powders, relatively soluble in water, difficultly soluble in dilute mineral acids soluble in concentrated sulfuric acid with green to blue colors, which are not modified by the addition of formaldehyde, form in water difficultly soluble from red to blue sodium salts and dye animal fibres in an acid bath from brownish violet to blue, very fast shades; on mordanted wool or when the dyeings are after treated with chromium compounds, the shades obtained vary from a brownish-violet to a bluish-black.

In order to further illustrate our invention the following examples are given, the parts being by weight.

*Example 1.*—10 parts 1—1'-dianthraquinonylamine are heated at 120–125° C. for several hours under exclusion of moisture with 100 parts 20% oleum, until a test sample poured into water (about 2 drops of the melt in 5 cc. water) dissolves, upon heating, with a clear red color, without any brown tinge, and until a test sample in concentrated sulfuric acid does not change its color by addition of formaldehyde. The melt is, after cooling, run while stirring into 400 parts water. The dyestuff precipitates partly, it is completely separated by precipitation with common salt, preferably from the hot solution. The precipitate is filtered hot, washed neutral with a dilute sodium chloride solution and dried.

The brownish red crystalline dyestuff so obtained is difficultly soluble in cold water, better soluble, with a deep cherry red color in hot water, and difficultly soluble in dilute mineral acid. Caustic soda precipitates from its water solution the difficultly soluble, red sodium salt. It is soluble in concentrated sulfuric acid with a green color, having an olive tinge; addition of formaldehyde does not alter its shade. In an acid bath it dyes wool a very fast brownish-violet shade, which does not change on afterchroming; the same shade is also obtained on mordanted wool.

When the dyestuff is heated to 140° C. in 95% sulfuric acid, the sulfogroups are eliminated and the well known 1—1'-dianthraquinonyloxazine is obtained. The dyestuff can therefore be represented by the graphic formula

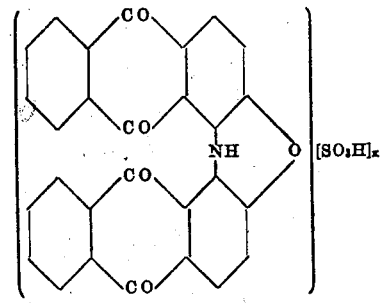

in which the index $x$ indicates that the number of sulfogroups in the molecule is unknown; the formula further shows that the correct position of the sulfogroups is still doubtful.

*Example 2.*—10 parts 1—2'-dianthraquinonylamine are stirred into 120 parts 20% oleum containing 4 parts anhydrous boric acid, and heated to 145° C. until a test sample of a few drops of the melt poured into about 10 cc. water and heated to boiling gives a violetish-red solution, which when made alkaline with caustic soda yields a dark blue precipitate.

The cold melt is stirred in 500 parts water. The sulfonic acid partly precipitates. It is completely salted out, filtered off, washed with a dilute sodium chloride solution and dried.

The dyestuff so obtained is a dark violet powder, soluble in water with a reddish-violet color, from which it is precipitated as violet floculas by the addition of mineral acid or common salt. It forms with caustic a difficultly soluble sodium salt. It dissolves in concentrated sulfuric acid with a pure blue color, which does not change on the addition of formaldehyde. It dissolves in 30% oleum with a greenish blue color.

Chemically, it is probably a sulfonic acid of a hydroxy-1—2'-dianthraquinonylamine. The product as obtained in the above procedure does not contain any substantial amounts of straight dianthraquinonylamine sulfonic acids.

Wool is dyed in an acid bath of the dyestuff, reddish-violet shades, which by afterchroming turn to a very fast bluish-black. The same bluish-black shade is obtained on chrome-mordanted wool.

*Example 3.*—5 parts 1—2'-dianthraquinonylamine are dissolved in 60 parts 10% oleum, containing 0.1 parts mercuric oxid and heated for several hours to 150° C., until a test sample dissolves in water with a dark blue color.

The melt is then poured into about 300 parts water, salted out, filtered off and dried. The dyestuff so obtained is a dark blue powder, soluble in water with a dark blue color, difficultly soluble in dilute mineral acid. Addition of caustic soda to its water solution precipitates a bluish-green sodium salt. It dissolves in concentrated sulfuric acid with a pure green color. Chemically the product is a poly-hydroxy-1—2'-dianthraquinonylamine sulfonic acid.

It dyes wool from an acid bath dark blue shades and on chrome mordanted wool, dark bluish-green fast shades.

We claim:—

1. In processes of producing oxy-dianthraquinonylamine sulfonic acids, substantially free from straight dianthraquinonylamine sulfonic acids, the step comprising submitting dianthraquinonylamines to an oxidative sulfonation substantially as described.

2. In processes of producing oxy-dianthraquinonylamine sulfonic acids, substantially free from straight dianthraquinonyl sulfonic acids, the steps comprising treating dianthraquinonylamine under oxidative conditions with oleum at temperatures from 100–160° C. and recovering the dyestuff formed.

3. In processes of producing oxy-dianthraquinonylamine sulfonic acids, substantially free from straight dianthraquinonylamine sulfonic acids, the steps comprising treating dianthraquinonylamines under oxidative conditions with oleum at temperatures ranging from 120–130° C. and recovering the dyestuff formed.

4. In processes of producing 1—1'-dianthraquinonyloxazine sulfonic acids the steps comprising heating 1—1'-dianthraquinonylamine with 20% oleum to 120–125° C. and recovering the dyestuff so formed.

5. As new products oxy-dianthraquinonylamine sulfonic acids, substantially free from straight dianthraquinonylamine sulfonic acids, which are from violet to blue to green crystalline powders, relatively soluble in water, difficultly soluble in dilute mineral acids, soluble in concentrated sulfuric acid with from blue to green colors, which are not changed by the addition of formaldehyde, forming in water difficultly soluble sodium salts, dyeing wool in an acid bath from brownish-violet to blue, very fast shades and dyeing chrome mordanted wool from brownish-violet to bluish-black, very fast shades.

6. As new products 1—1'-dianthraquinonyloxazine sulfonic acids substantially free from straight dianthraquinonylamine sulfonic acids, which are brownish-red, crystalline powders, soluble in hot water, from which solution caustic soda precipitates difficultly soluble, red sodium salts; soluble in concentrated sulfuric acid with a green color, having an olive tinge and which is not altered by the addition of formaldehyde, and dyeing wool from an acid bath brownish-violet shades, the same shades being obtained by afterchroming or on chrome mordanted wool.

In testimony whereof we have hereunto set our hands.

WALTER MIEG.
HEINRICH RAEDER.